(12) United States Patent
Jaiswal et al.

(10) Patent No.: US 10,938,879 B2
(45) Date of Patent: Mar. 2, 2021

(54) THIRD-PARTY AD ACCELERATION

(71) Applicant: Akamai Technologies, Inc., Cambridge, MA (US)

(72) Inventors: Sharad Jaiswal, Mountain View, CA (US); Madhukar Nagaraja Kedlaya, Sunnyvale, CA (US); Rajaram Suresh Gaunker, Santa Clara, CA (US); Padmapani Ganti, Fremont, CA (US); Hariharan Kolam, Palo Alto, CA (US); Mehrdad Reshadi, Sunnyvale, CA (US); Girish Vaitheeswaran, San Jose, CA (US)

(73) Assignee: Akamai Technologies, Inc., Cambridge, MA (US)

(*) Notice: Subject to any disclaimer, the term of this patent is extended or adjusted under 35 U.S.C. 154(b) by 0 days.

(21) Appl. No.: 16/430,054

(22) Filed: Jun. 3, 2019

(65) Prior Publication Data

US 2019/0373043 A1 Dec. 5, 2019

Related U.S. Application Data

(60) Provisional application No. 62/680,346, filed on Jun. 4, 2018.

(51) Int. Cl.
*H04L 29/08* (2006.01)
*G06F 40/14* (2020.01)

(52) U.S. Cl.
CPC .............. *H04L 67/02* (2013.01); *G06F 40/14* (2020.01); *H04L 67/20* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 9,401,949 B1* | 7/2016 | Kolam | H04L 67/2842 |
| 2012/0079057 A1 | 3/2012 | Fainberg | |
| 2012/0254429 A1* | 10/2012 | Feng | H04L 61/304 |
| | | | 709/225 |
| 2015/0088970 A1* | 3/2015 | Wei | H04L 67/2819 |
| | | | 709/203 |
| 2015/0281318 A1* | 10/2015 | Warner | G06F 16/95 |
| | | | 709/217 |
| 2017/0358011 A1* | 12/2017 | Guermas | G06F 3/0481 |
| 2018/0246619 A1* | 8/2018 | Galameau | G06F 3/0481 |

FOREIGN PATENT DOCUMENTS

CN 103336702 10/2013

* cited by examiner

*Primary Examiner* — Jeffrey R Swearingen (57) ABSTRACT

A method of delivering a webpage is disclosed. It is determined that delivery of at least a portion of third-party content associated with a webpage is to be accelerated. One or more pre-conditions to be met prior to the delivery of the accelerated third-party content are determined. A loading order configuration for the webpage is determined based at least in part on the one or more pre-conditions. At least a portion of the webpage that modifies a loading order of content portions of the webpage is determined based on the loading order configuration.

29 Claims, 8 Drawing Sheets

<html>
  <head>
    <title>Welcome</title>
  </head>
  <body>
    <h1>HelloWorld</h1>

•
         •
         •

<img src = "url for image"/>
    <video>
        <source src = "url for video" type = "video/ogg" />
    </video>
    script {
        <script type = "text/javascript">
        <!--script
        *** Some javascript code is placed here ***
        -- >
        </script>
    }
    </body>
</html>
```

THIRD-PARTY AD ACCELERATION

CROSS REFERENCE TO OTHER APPLICATIONS

This application claims priority to U.S. Provisional Patent Application No. 62/680,346 entitled DELIVERY OF THIRD PARTY TAGS IN A WEB APPLICATION filed Jun. 4, 2018 which is incorporated herein by reference for all purposes.

BACKGROUND OF THE INVENTION

Third-party tags are snippets of code added to webpages that serve a range of different purposes, including delivering advertisements and collecting marketing analytics. Although these third-party tags and the associated third-party services may raise the revenue for the web publisher of the website and provide invaluable insights about their users, these third-party tags may significantly affect the performance of the website's first-party original content, such as the loading speed of the webpages. This is because these third-party tags generate HyperText Transfer Protocol (HTTP) requests to third-party servers. As a result, the third-party tags introduce latency, which can heavily impact page speed. Therefore, improved techniques of enhancing the performance of selected third-party tags in a web application without compromising the performance of first-party original content are desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a Nanovisor such as a processor or a memory described as being configured to perform a task may be implemented as a general Nanovisor that is temporarily configured to perform the task at a given time or a specific Nanovisor that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some third-party tags added to a webpage are performance-sensitive in the sense that if they are loaded sooner, the revenue per page load is directly increased. One example of third-party tags that are performance-sensitive are advertisement tags (or Ad tags) that are used for displaying advertisements on a webpage. For an advertisement (Ad) to be considered "viewed," at least 50% of the banner or creative must display on the screen for more than a second, according to the Internet Advertising Bureau's standard. Loading the Ad tags earlier results in higher Ad viewability and therefore higher revenue per page load.

Some other third-party tags are not performance-sensitive in the sense that if they are loaded later, the revenue per page load is not affected. One example of third-party tags that are not performance-sensitive are marketing data gathering or analytics tags that are used for collecting information about a visitor to a website or the visitor's behavior on the website, which are then sent to a marketing platform to be processed and reported. Loading these marketing data gathering or analytics tags provides valuable marketing information for the website and therefore contributes to the overall revenue in the aggregate. However, loading these third-party tags earlier does not directly increase the revenue per page load.

Since the third-party tags generate HTTP requests to third-party servers, they introduce latency, which can heavily impact the loading speed of the website's first-party original content. In the present application, the third-party tags are divided into two categories: performance-sensitive and non-performance-sensitive. In some embodiments, the delivery of the performance-sensitive third-party tags is accelerated. In some embodiments, the delivery of the non-performance-sensitive third-party tags is deferred. The techniques disclosed in the present application have many benefits. The delivery performance of the first-party tags is not compromised as a consequence of either speeding up the delivery of the performance-sensitive third-party tags or deferring the delivery of the non-performance-sensitive third-party tags. As a result, the revenue generated by a website is increased while maintaining a high level of user satisfaction.

Figure 1:
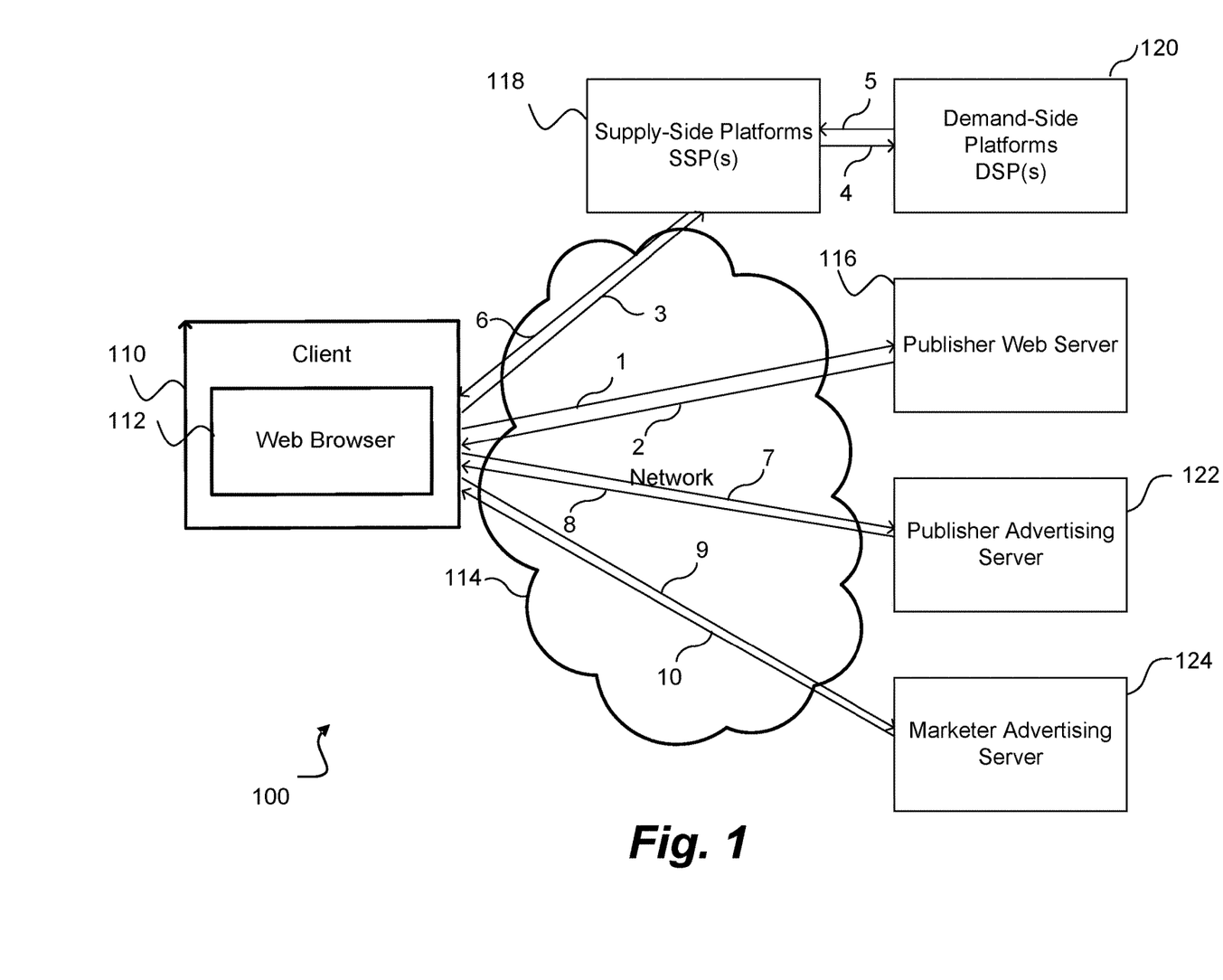
FIG. 1 is a block diagram 100 illustrating an embodiment of a web browser 112 running a web application or accessing a webpage provided by a publisher web server 116 and loading other third-party tags, such as tags for displaying advertisements on the web browser 112.

FIG. 1 is a block diagram 100 illustrating an embodiment of a web browser 112 running a web application or accessing a webpage provided by a publisher web server 116 and loading other third-party tags, such as tags for displaying advertisements on the web browser 112. Web browser 112 runs on a client device 110 and accesses webpages and other information through a network 114. Network 114 may be any combination of public or private networks, including intranets, local area networks (LANs), wide area networks (WANs), radio access networks (RANs), Wi-Fi networks, the Internet, and the like. Client device 110 may be any types of devices, including laptop computers, desktop computers, tablet computers, smartphones, and other mobile devices.

A webpage accessed by web browser 112 may be described by different markup languages, including Hypertext Markup Language (HTML), Extensible Markup Language (XML), and the like. The webpage may be described by other custom languages as well. HTML is used hereinafter as an example of the various languages for describing webpages. Note that the examples of HTML are selected for illustration purposes only; accordingly, the present application is not limited to these specific examples.

The webpage may also comprise content in the form of dynamically executable code, defined in terms of one or more programming languages (e.g., JavaScript, JavaScript Object Notation (JSON), etc.), such as interpreted programming languages, scripting languages, managed programming languages, web programming languages, etc. The webpage may also comprise content in the form of one or more display attributes, defined in a style sheet language such as the Cascading Style Sheets (CSS) language.

Figure 2:
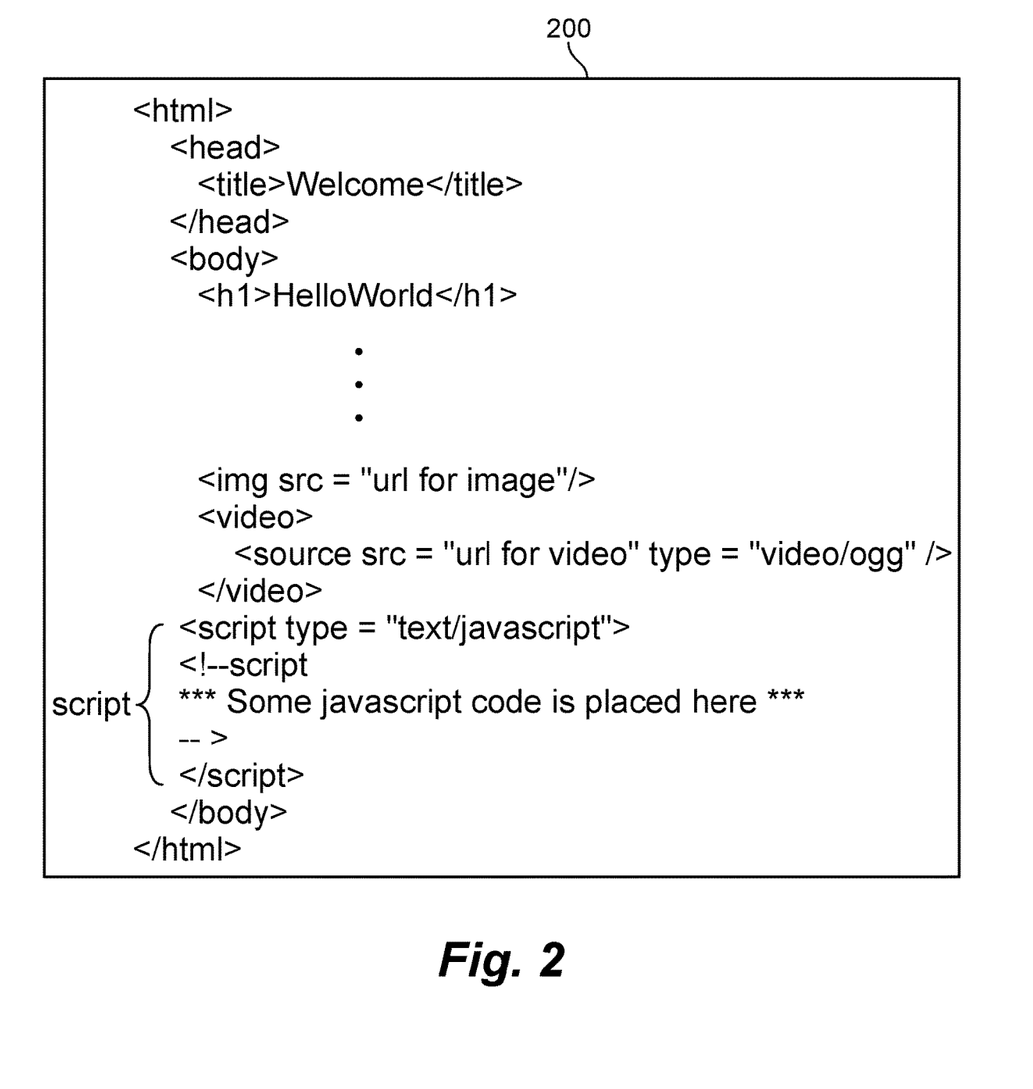
FIG. 2 is a diagram illustrating an embodiment of a webpage definition 200 described by an HTML file.

FIG. 2 is a diagram illustrating an embodiment of a webpage definition 200 described by an HTML file. The webpage definition 200 may refer to one or more dependent resources to be obtained and/or rendered by the web browser 112. Examples of such resources include image files, script files, video files, audio files, Adobe Flash content, HTML5 content, other webpage files, and the like. Typically, the resources are stored in one or more repositories that are located remote from the client device 110 and are retrieved by the web browser 112 prior to rendering of the associated webpage, or portion thereof. The web browser 112 may locate and retrieve the one or more resources based on one or more respective resource identifiers associated with the webpage definition 200. Examples of a resource identifier include a Uniform Resource Identifier (URI), a Uniform Resource Locator (URL), a network path, a location address, a storage location and any other content identifier. The one or more resource identifiers may be included in the webpage definition 200 retrieved by the web browser 112 and/or generated dynamically in response to execution of executable code (e.g., JavaScript) included or referenced by the webpage definition 200.

With reference to FIG. 1, to display the webpage, web browser 112 sends a Hypertext Transfer Protocol (HTTP) request message (arrow 1) to publisher web server 116 requesting the HTML webpage file. After publisher web server 116 locates the requested HTML webpage file, publisher web server 116 returns the requested HTML webpage file in an HTTP response message (arrow 2) to web browser 112. As web browser 112 begins to render the webpage on a screen, web browser 112 parses the received webpage file and builds a data structure to represent the various components of the webpage in a local memory.

The Document Object Model (DOM) is a standardized model supported by different web browsers, e.g., Internet Explorer, Firefox, and Google Chrome, for representing the various components of a webpage. The DOM is a cross-platform and language-independent convention for representing and interacting with objects in HTML documents as well as XHTML and XML documents. Objects in a DOM tree may be addressed and manipulated using methods on the objects. The public interface of a DOM is specified in its application programming interfaces (APIs), known as the DOM APIs.

The DOM standard includes different levels. DOM core level 0 and level 1 are the core standards supported by all web browsers. DOM levels 2 and above are extensions to DOM core level 0 and level 1, which can be optionally supported by different web browsers. DOM core level 0 and level 1 define a minimal set of objects and interfaces for accessing and manipulating document objects. The DOM provides a complete model for an entire HTML document, including the means to change any portion of the document.

The DOM standard represents documents as a hierarchy of node objects, called a DOM tree. Within the document structure hierarchy, some types of nodes may have child nodes of various types, while other nodes are leaf nodes that cannot have any object below them.

Figure 3:
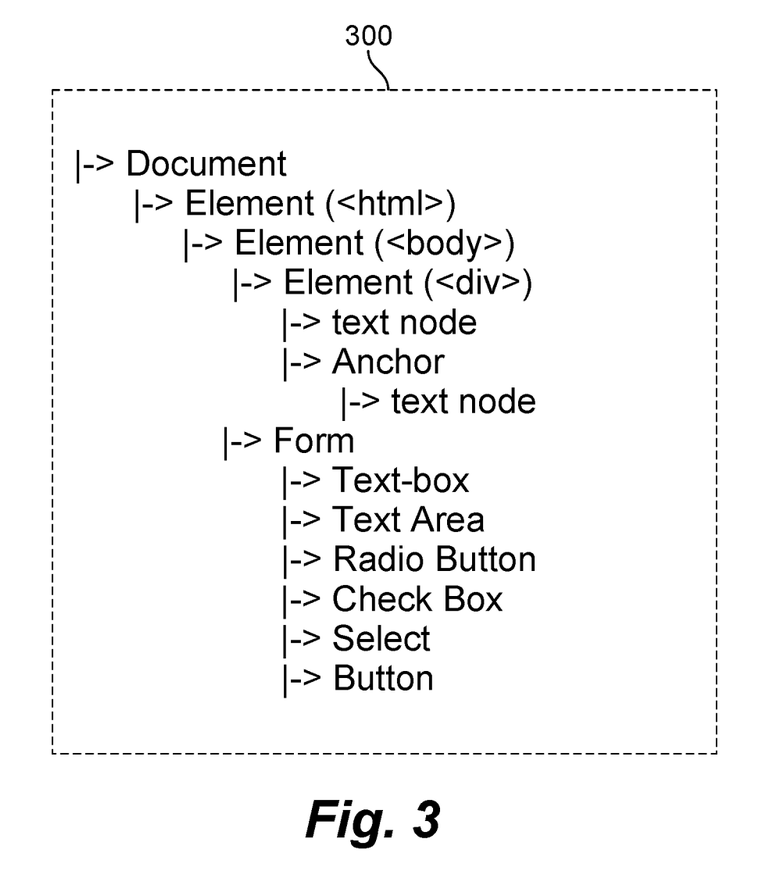
FIG. 3 is a diagram illustrating an embodiment of a DOM tree 300.

FIG. 3 is a diagram illustrating an embodiment of a DOM tree 300. As shown in FIG. 3, the topmost node, or root, of DOM tree 300 is the document object. A document object represents an entire HTML (or XML) document, and it provides the primary access to the document's data. The element object represents an element in the HTML document. Other types of nodes in the DOM tree may include text nodes, anchors, text-boxes, text areas, radio buttons, check boxes, selects, buttons, and the like.

With continued reference to FIGS. 1 and 2, when web browser 112 renders webpage definition 200 on a screen, web browser 112 parses the received HTML webpage file and builds a DOM tree to represent the various components of webpage definition 200 in a local memory. For example, when the first-party image tag (shown as <img src="url for image"/> in FIG. 2) is parsed by web browser 112, the image is represented as an image object, and the image object is accordingly inserted into the DOM tree.

After the webpage file is parsed and the corresponding DOM tree is created, the entire DOM tree can be traversed to retrieve any dependent resources (e.g., images, JavaScripts, audio clips, or videos) indicated by any of the nodes in the DOM tree via a network. For example, the image object corresponding to the image tag in webpage definition 200 redirects web browser 112 to fetch an image file from a uniform resource locator (URL). Accordingly, web browser 112 sends a request via a network, requesting the image resource to be downloaded. There are two ways a request may be issued: statically, in which case it is the browser which manipulates the DOM; or dynamically, in which case the DOM manipulation is done by JavaScript. In response to the request, the requested dependent resource is sent to web browser 112 via a network.

A web application may include scripts that are executed when different DOM events occur. DOM event APIs allow event-driven programming languages (e.g., JavaScript, Jscript, ECMAScript, VBScript, and Java) to register various DOM event handlers/listeners with the element nodes inside a DOM tree. Different types of events can be generated by the element nodes inside a DOM tree, including mouse events, keyboard events, HTML frame/object events, HTML form events, user interface events, mutation events, progress events, and the like. For example, the DOM event API "onclick" is triggered when a user clicks on an element, and a script that has registered as a callback script for the "onclick" event will be executed. In another example, the DOM event APIs "onKeyDown" and "onKeyup" are triggered when a user presses a key and releases a key, respectively. In another example, the DOM event API "oninput" is triggered when an element receives user inputs.

Besides the original first-party content, web browser 112 also loads other third-party tags, such as tags that are related to the displaying of advertisements. In the example shown in FIG. 1, the Ad auction process is a header bidding process in which a publisher may offer an Ad space out to multiple potential bidders. Header bidding is also referred to as advance bidding or pre-bidding. Header bidding allows a web publisher to have a simultaneous auction with all the bidders. However, other Ad auction processes may be used as well. For example, in a more traditional setup, one or more advertising networks may be called sequentially (in a waterfall set-up) until an Ad is served.

With reference to FIG. 1, after the web browser 112 has received the requested HTML webpage file (arrow 2) and the web browser 112 is beginning to load and render the first-party content, an Ad auction process is initiated. A third-party tag script on the webpage redirects the web browser 112 to one or more supply-side platforms (SSPs) 118. In particular, web browser 112 sends bid requests (arrow 3) to one or more SSPs 118 in parallel. The SSPs 118 conduct auction(s) (arrow 4) with one or more demand-side platforms (DSPs) 120. The DSPs 120 then respond (arrow 5) with a plurality of bids. The SSPs 118 determine the winning bid value and return it (arrow 6) to the web browser 112. Web browser 112 then passes the bid value into an Ad request call (arrow 7) to a publisher advertising server 122. The publisher advertising server 122 determines a final line item to serve and redirects the web browser 112 (arrow 8) to a marketer advertising server 124. For example, the publisher advertising server 122 may determine a pre-bid SSP line item to serve and redirects the web browser 112 to the marketer advertising server 124. Web browser 112 then sends a request (arrow 9) to the marketer advertising server 124. In response, the marketer advertising server 124 returns a final creative (arrow 10) to the web browser 112, such that the web browser 112 may render the final creative on the screen.

In some embodiments, to accelerate the delivery of the performance-sensitive third-party tags that are related to advertisements, the initiation of the Ad auction process is accelerated. By starting the Ad auction process (arrow 3 in FIG. 1) earlier, the advertisements may be loaded earlier.

Figure 4:
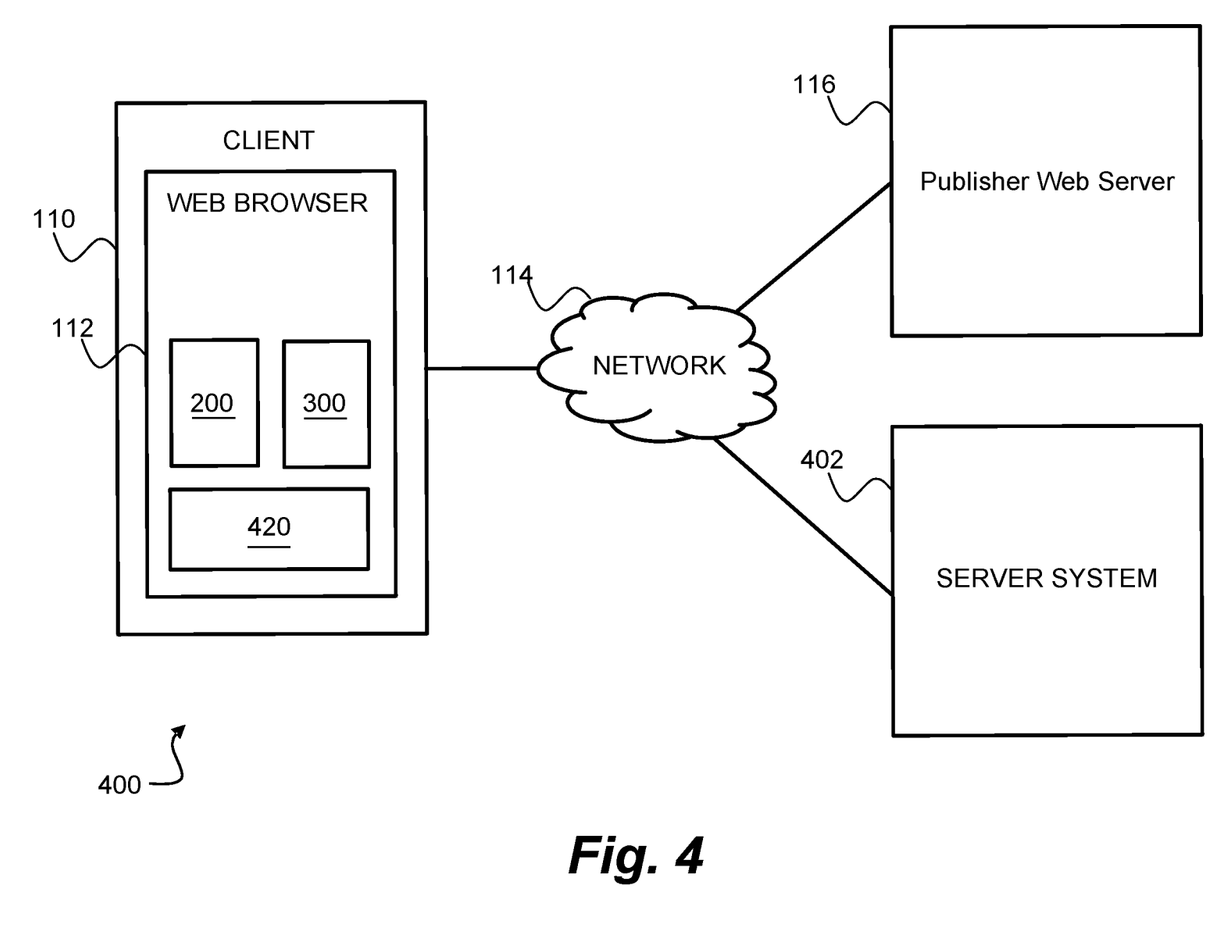
FIG. 4 illustrates a system 400 for accelerating the delivery of a plurality of performance-sensitive third-party tags.

FIG. 4 illustrates a system 400 for accelerating the delivery of a plurality of performance-sensitive third-party tags. System 400 illustrates a client device 110, a server system 402, and the publisher web server (also an origin server) 116 communicating across network 114. Client device 110 includes the web browser 112.

System 400 of FIG. 4 additionally comprises a server system 402 which acts as a proxy between the client device 110 and the publisher web server 116 and facilitates the delivery of web content from the publisher web server 116 to the client device 110 over the network 114. That is, the server system 402 is configured to act as an intermediary for requests for webpages originating from the web browser 112 configured on the client device 110. In this respect, the server system 402 may operate transparently (e.g., without requiring any manual configuration by an end user and/or a content origin). In some examples, the server system 402 may comprise a proxy server, a gateway server, an edge server, or any other apparatus suitable for implementing the following techniques. In some embodiments, server system 402 is a server that belongs to a content delivery network or content distribution network (CDN).

According to some embodiments, a Nanovisor 420 (e.g., Nanovisor 420 is also referred to as a virtualization client 420) may be configured to control manipulation of a data structure 300 representing the structure of the webpage defined by webpage definition 200. For example, Nanovisor 420 may be configured to control access to a DOM (Document Object Model) tree 300 by intercepting requests to the DOM interface. In effect, Nanovisor 420 serves as a virtualization layer to control access to the DOM interface. This virtualization may be facilitated by one or more wrapper methods/functions with respect to one or more of the APIs of the DOM (e.g., Document API interface of a webpage) that replace and wrap corresponding standard API methods/functions of the DOM (e.g., method API calls to create, delete or update elements in the DOM via a Document API interface are replaced with corresponding wrapper methods). For example, particular memory address locations identifying standard code of the DOM API (e.g., Document API) methods/calls are replaced with memory address locations of replacement wrapper methods/functions provided via Nanovisor 420. In some embodiments, DOM core level 1 APIs for manipulating the DOM tree are supplanted by the equivalent interfaces provided via Nanovisor 420. In this manner, Nanovisor 420 is able to intercept requests for resources and modify the requests (e.g., transform/encode the resource location identifier, or URL, of a request) in a manner that is transparent to other processes running within the web browser 112 environment. This virtualization of the DOM interface can be used by Nanovisor 420 to implement some of the steps of the third-party tags delivery techniques that are performed on the client device.

According to some embodiments, one optimization enabled by virtualization of the DOM involves the encoding of resource identifiers, wherein to cause the web browser 112 to request a resource from a content server other than that from which the resource would be requested without the encoding. For example, rather than requesting resources from an origin server, resources may be requested from a proxy server (e.g., server system 402). In some embodiments, Nanovisor 420 may utilize one or more API method/function wrappers to intercept a request to add or modify an object stored in the DOM tree and modify any resource identifiers included in the request.

In some examples, the request to add or modify an object in the DOM tree may originate from one or more executable code in or referenced by the webpage definition 200, which are executed by the web browser 112 and intercepted to invoke Nanovisor 420. In this manner, Nanovisor 420 is able to transform dynamically generated and utilized resource identifiers before they are added to the DOM tree. This feature provided by Nanovisor 420 is referred to as Nanovisor resource domain dynamic transformation. As will be described in greater details below, this feature may be used to implement some of the steps of the third-party tags delivery techniques that are performed on the client device.

In some examples, the one or more executable code which invoke and implement Nanovisor 420 may be inserted into the webpage definition 200 by the server system 402 prior to delivering the webpage definition 200 to the client device 110.

In some embodiments, Nanovisor 420 is configured to control access to the DOM interface to "intercept" resource requests originating from the one or more code instructions such that the timing of network requests for resources is altered. For example, resource requests may be intercepted and the sending of the corresponding network requests for the resources is deferred. This feature provided by Nanovisor 420 is referred to as Nanovisor network request deferral. As will be described in greater details below, this feature may be used to implement some of the steps of the third-party tags delivery techniques that are performed on the client device. To achieve this, Nanovisor 420 may implement one or more wrapper methods/functions with respect to one or more APIs that cause the web browser 112 to issue network requests. For example, Nanovisor 420 may implement one or more wrapper methods for the .setAttribute API method to intercept setting of an attribute of a DOM element. In some examples the requests to the API call may originate from a script included in the webpage definition 200 and/or a script resource referenced by the webpage definition 200, which, when executed, includes one or more dynamic resource identifiers.

In some embodiments, when web browser 112 requests a webpage from server system 402, the web browser is provided by server system 402 a modified webpage file of the original webpage. For example, rather than providing the originally requested HTML file of the original requested webpage, the web browser is provided an alternative webpage file of the original webpage that includes Nanovisor 420. In some embodiments, rather than providing the full HTML webpage file of an original requested webpage, the web browser 112 is provided an alternative webpage file of the original webpage that includes Nanovisor 420, but not the complete contents of the requested webpage (e.g., HTML file) that would have been provided in a traditional response. This feature provided by server system 402 is referred to as server system webpage content transformation. As will be described in greater details below, the server system webpage content transformation feature may be used to implement some of the steps of a technique known as HTML streaming, which is in turn used to implement some of the steps of the third-party tags delivery techniques.

When web browser 112 attempts to render the alternative webpage file, Nanovisor 420 is executed; Nanovisor 420 may then request and receive contents of the original requested webpage. Because this allows Nanovisor 420 to access the contents of the original requested webpage prior to including it in the DOM for rendering by a web browser, Nanovisor 420 is able to modify the contents of the original requested webpage, including a resource identifier. This feature provided by Nanovisor 420 is referred to as Nanovisor resource domain static transformation. As will be described in greater details below, this feature may be used to implement some of the steps of the third-party tags delivery techniques that are performed on the client device.

In some embodiments, instead of having Nanovisor 420 to modify the contents of the original requested webpage, including a resource identifier, server system 402 may modify the contents of the original requested webpage and form the alternative webpage file of the original webpage with a modified resource identifier. This feature provided by server system 402 is referred to as server system resource domain static transformation. As will be described in greater details below, this feature may be used to implement some of the steps of the third-party tags delivery techniques that are performed by the server system 402. In some embodiments, rather than requesting a resource of a webpage to be rendered directly from its original content source identified by an original webpage, the request is proxied and/or rerouted via an intermediary such as server system 402 by using the Nanovisor resource domain static transformation feature or the server system resource domain static transformation feature.

In some embodiments, Nanovisor 420 may be injected into a webpage based on standards-based (e.g., HTML, JavaScript, ActionScript, etc.) procedures. For example, after server system 402 receives a request from web browser 112 requesting an HTML webpage file, server system 402 injects code implementing Nanovisor 420 into an alternative HTML webpage file of the requested HTML file, and then sends the response back to web browser 112. In some embodiments, Nanovisor 420 may be injected into a webpage by the publisher web server 116 directly. For example, web browser 112 requests an HTML webpage file directly from publisher web server 116 and publisher web server 116 provides an alternative webpage file with the code of injected Nanovisor 420. Publisher web server 116 may be a content producer of the provided content. In some embodiments, Nanovisor 420 may be injected by adding JavaScript client code in the head section of an alternative HTML webpage file.

Figure 5:
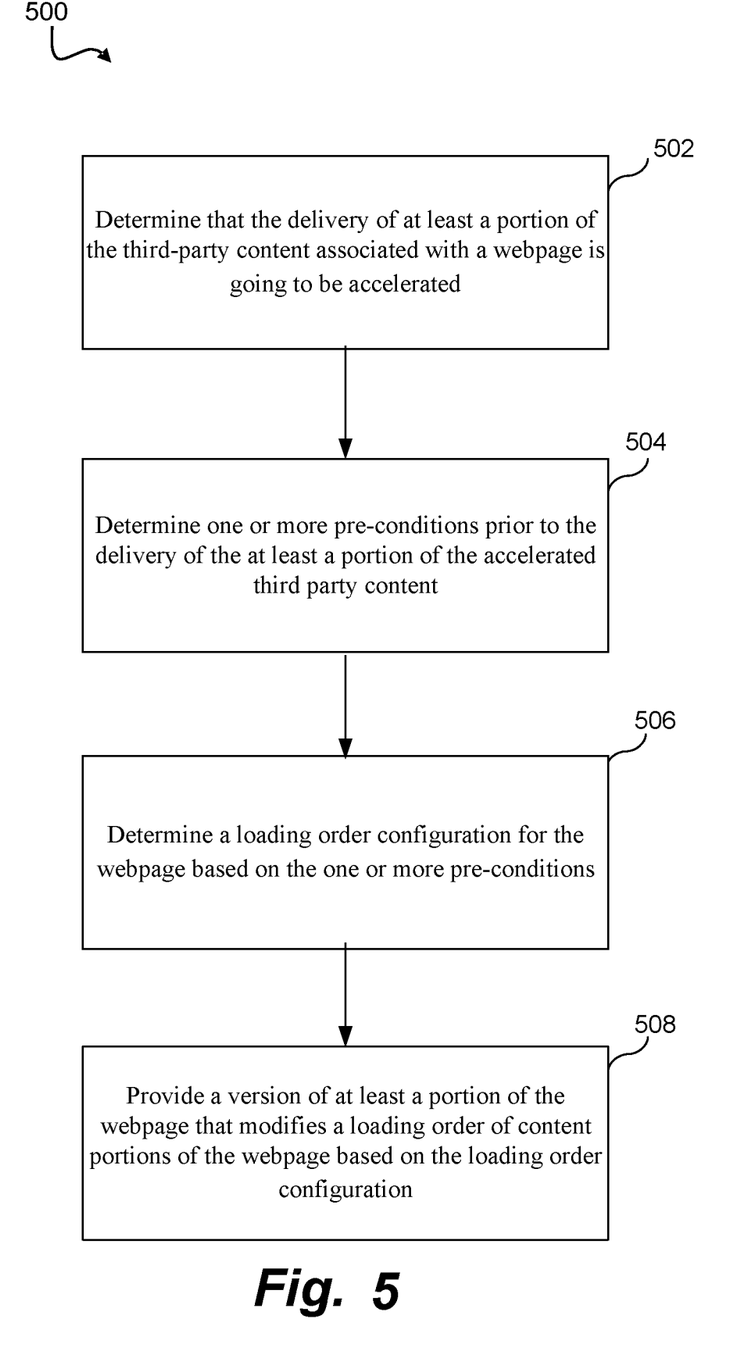
FIG. 5 illustrates a process 500 for accelerating the delivery of a plurality of performance-sensitive third-party tags.

FIG. 5 illustrates a process 500 for accelerating the delivery of a plurality of performance-sensitive third-party tags. In some embodiments, process 500 is performed by system 400.

At step 502, a webpage is analyzed. In some embodiments, the third-party tags associated with the webpage are divided into two categories: performance-sensitive and non-performance-sensitive. For example, it is determined by server system 402 that the delivery of at least some of the third-party tags (e.g., some of the third-party tags that are related to advertisement) is accelerated and the delivery of at least some of the third-party tags (e.g., some of the third-party tags that are related to marketing data gathering) does not need to be accelerated or should be deferred.

At step 504, one or more pre-conditions that are required to be satisfied prior to the delivery of the accelerated portions of the third-party tags are determined. In some embodiments, the delivery of the performance-sensitive third-party tags is accelerated by satisfying all the pre-conditions that are required prior to the initiation of the Ad auction process. There are different types of pre-conditions.

One category of pre-conditions is directly related to the Ad auction process. The delivery of the performance-sensitive third-party tags may be directly accelerated by loading all the resources that are required prior to the execution of the Ad auction process. Depending on the Ad auction process (e.g., header bidding or waterfall auction) chosen by a particular web publisher, the resources that are required prior to the initiation of the Ad auction process may vary. For example, the resources may include a collection of libraries required for the execution of the Ad auction process. Some examples of libraries required for different Ad auction processes include prebid.js, Google Publisher Tags (GPT), and the like. Prebid.js provides a simple and easy to implement code set to improve header bidding for display and video ads on a publisher's website and within over-the-top (OTT) applications. GPT is an ad tagging library for dynamically building ad requests. GPT takes key details (such as ad unit code, ad size, and key-values), builds the request, and displays the ad on webpages or mobile applications. In some embodiments, in addition to pre-loading the libraries required for the Ad auction process, some of the executable scripts in the libraries may be pre-executed ahead of time.

Another category of pre-conditions is not directly related to the Ad auction process used by the particular web publisher. In order to achieve a certain level of end-user browsing experience, some web publishers enforce certain rules that a minimum set of events or at least a minimum portion of first-party contents has been loaded before any third-party tags may begin to load. This will ensure that the at least some of the first-party contents are displayed on the screen before advertisements are displayed. Preserving these rules set by the web publisher has the benefit of enhancing the performance of selected third-party tags in a web application without compromising the performance of the first-party original content. Therefore, the delivery of the performance-sensitive third-party tags may be accelerated by triggering all the required events and loading all the required first-party resources prior to the initiation of the Ad auction process. Depending on the particular web publisher or the Ad auction process (e.g., header bidding or waterfall auction) chosen by the particular web publisher, the events that need to be triggered and the first-party resources that need to be fetched prior to the initiation of the Ad auction process may vary. The events may include HTML DOM events (e.g., onload events) that allow JavaScript to register different event handlers on elements in an HTML document. To trigger these required events, the loading of first-party tags/resources may also need to be loaded. For example, if the required event is an onload event, then the loading of all the resources corresponding to the onload event needs to be finished before the onload event is triggered. As a result, the loading of these resources in turn becomes part of the required pre-conditions.

In some embodiments, at least some of the one or more pre-conditions that are required to be satisfied prior to the delivery of the accelerated portions of the third-party tags are provided by the web publisher. For example, a web publisher may provide system 400 with a list of pre-conditions (e.g., loading of libraries and other resources and triggering of different events) that are required to be satisfied prior to the delivery of the accelerated portions of the third-party tags.

In some embodiments, at least some of the one or more pre-conditions that are required to be satisfied prior to the delivery of the accelerated portions of the third-party tags are learned by system 400 by performing a profiling process for the webpage. In some embodiments, a timeline is determined by the profiling process for the loading of the webpage onto a client device. For example, the timeline may include timestamps related to the loading of different resources (e.g., libraries for the Ad auction process and other first-party or third-party resources), such as the timestamps corresponding to the resource requests or the timestamps corresponding to the timing when those resources are loaded. The timeline may also include timestamps related to the triggering of different events. The timeline may include timestamps corresponding to different DOM events that are generated by the element nodes inside a DOM tree, including mouse events, keyboard events, HTML frame/object events, HTML form events, user interface events, mutation events, progress events, and the like. The timeline may also include timestamps when the deliveries of the different accelerated portions of the third-party tags begin. The timeline may also include a timestamp when the Ad auction process begins.

Some of the timestamps may be obtained by Nanovisor 420. For example, because Nanovisor 420 has the capability of intercepting different DOM APIs, including resource requests, Nanovisor 420 may obtain timestamps corresponding to those resource requests. Because Nanovisor 420 has the capability of intercepting different DOM event APIs, including DOM event API "onload," Nanovisor 420 may obtain timestamps corresponding to those triggered events. Some of the timestamps may be obtained by server system 402 or other proxy servers. For example, if the request of a particular resource that is fetched by web browser 112 has been redirected to server system 402 or another proxy server, then server system 402 or the proxy server will receive the request and may record a timestamp corresponding to the resource request.

In some embodiments, the profiling process for the webpage further includes the collecting of the timestamps. For example, server 402 may receive the collected timestamps from Nanovisor 420 or other proxy servers and assemble the collected timestamps to form a timeline for the loading of the webpage.

In some embodiments, the profiling process for the webpage further includes analyzing a plurality of timelines for the loading of the webpage by server system 402. In some embodiments, the plurality of timelines for the loading of the webpage includes timelines corresponding to a single client device 110 collected over a predetermined period of time. In some embodiments, the plurality of timelines for the loading of the webpage includes timelines corresponding to a plurality of client devices and that are collected over a predetermined period of time. By analyzing a plurality of timelines for the loading of the webpage, the dependency relationships between different events and resources may be inferred, and the one or more pre-conditions that are required to be satisfied prior to the delivery of the accelerated portions of the third-party tags may be inferred. Many techniques may be used to infer the one or more pre-conditions, and the examples provided herein are illustrative examples only and are not intended to be exhaustive. In one example, if the timestamps related to the loading of resource #1-resource #N always precede the delivery of the accelerated portions of the third-party tags, then resource #1-resource #N may be inferred as the one or more pre-conditions. In another example, if the timestamps related to the loading of resource #1-resource #N always precede the Ad auction process, then resource #1-resource #N may be inferred as the one or more pre-conditions. In yet another example, if the timestamps related to event #1-event #N always precede the delivery of the accelerated portions of the third-party tags, then event #1-event #N (and their related resources) may be inferred as the one or more pre-conditions.

With reference to FIG. 5, at step 506, a loading order configuration for the webpage may be determined based at least in part on the one or more pre-conditions determined at step 504 of process 500. In some embodiments, the loading order configuration for the webpage includes a list of the resources in a sequential order, wherein a resource listed earlier on the list is configured to load at an earlier time than a resource that is listed later on the list. In some embodiments, the loading order configuration lists the resources corresponding to the one or more pre-conditions determined at step 504 of process 500. In some embodiments, the loading order configuration lists the resources corresponding to the one or more pre-conditions determined at step 504 of process 500 at the beginning, followed by at least some of other remaining resources of the webpage. In some embodiments, the loading order configuration further lists the resources corresponding to the one or more pre-conditions determined at step 504 of process 500 based on the timestamps corresponding to those pre-conditions. For example, if resource A and resource B are both resources that are determined as pre-conditions, and resource A is always (or almost always) loaded ahead of resource B, then a dependency of resource B on resource A may be inferred, and therefore resource A may be listed ahead of resource B in the loading order configuration. One skilled in the art should realize that many techniques may be used to determine a loading order configuration for the webpage, and the examples provided herein are illustrative examples only and are not intended to be exhaustive.

At step 508, at least a portion of the webpage that modifies a loading order of the content portions of the webpage based on the loading order configuration is provided by server system 402 to web browser 112 of client device 110. The provided portion of the webpage is a modified webpage referred to as a cached stub of the webpage and is delivered by server system 402 to web browser 112 using a technique known as HTML streaming, which will be briefly described in FIGS. 6-8 below. HTML streaming provides an optimized content delivery environment for efficiently delivering dynamic webpages. U.S. patent application Ser. No. 14/998,075, entitled HTML STREAMING, filed Dec. 23, 2015, claims priority to U.S. Provisional Patent Application No. 62/101,134, entitled HTML STREAMING, filed Jan. 8, 2015, and are both incorporated herein by reference for all purposes. Using HTML streaming, the cached stub includes all the information that is required by web browser 112 or Nanovisor 420 to load the resources included in the loading order configuration list ahead of the remaining resources of the webpage. In some embodiments, the information is included in the head section of the cached stub, which is cached on server system 402. The cached stub may be sent to web browser 112 as soon as server system 402 receives the request for the webpage from web browser 112. When web browser 112 receives the cached stub, web browser 112 may then immediately pre-load the resources included in the loading order configuration in the prescribed order. As a result, the wait time of the accelerated portions of the third-party tags is reduced, thereby increasing the viewability and revenue potential of the accelerated third-party tags.

Figure 6:
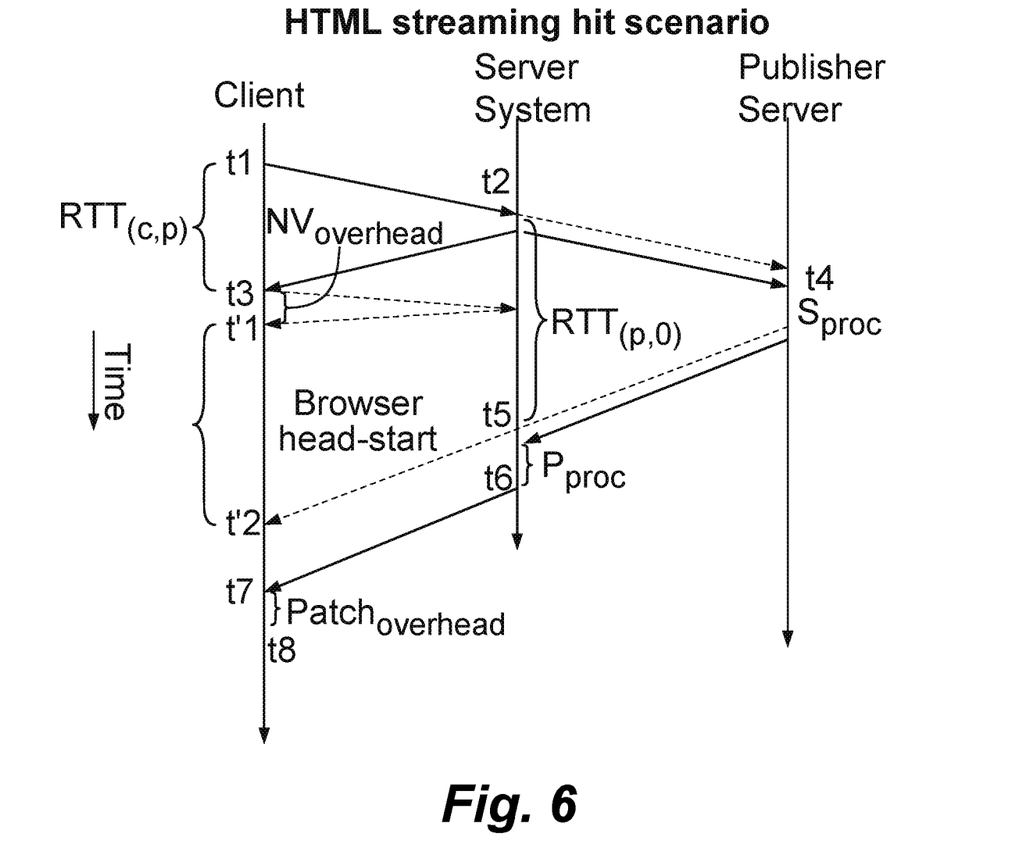
FIG. 6 is a timing diagram illustrating an exemplary sequence of requests and responses sent and received by client device 110, server system 402, and publisher web server 116 when HTML streaming is used to deliver a webpage.
Figure 7:
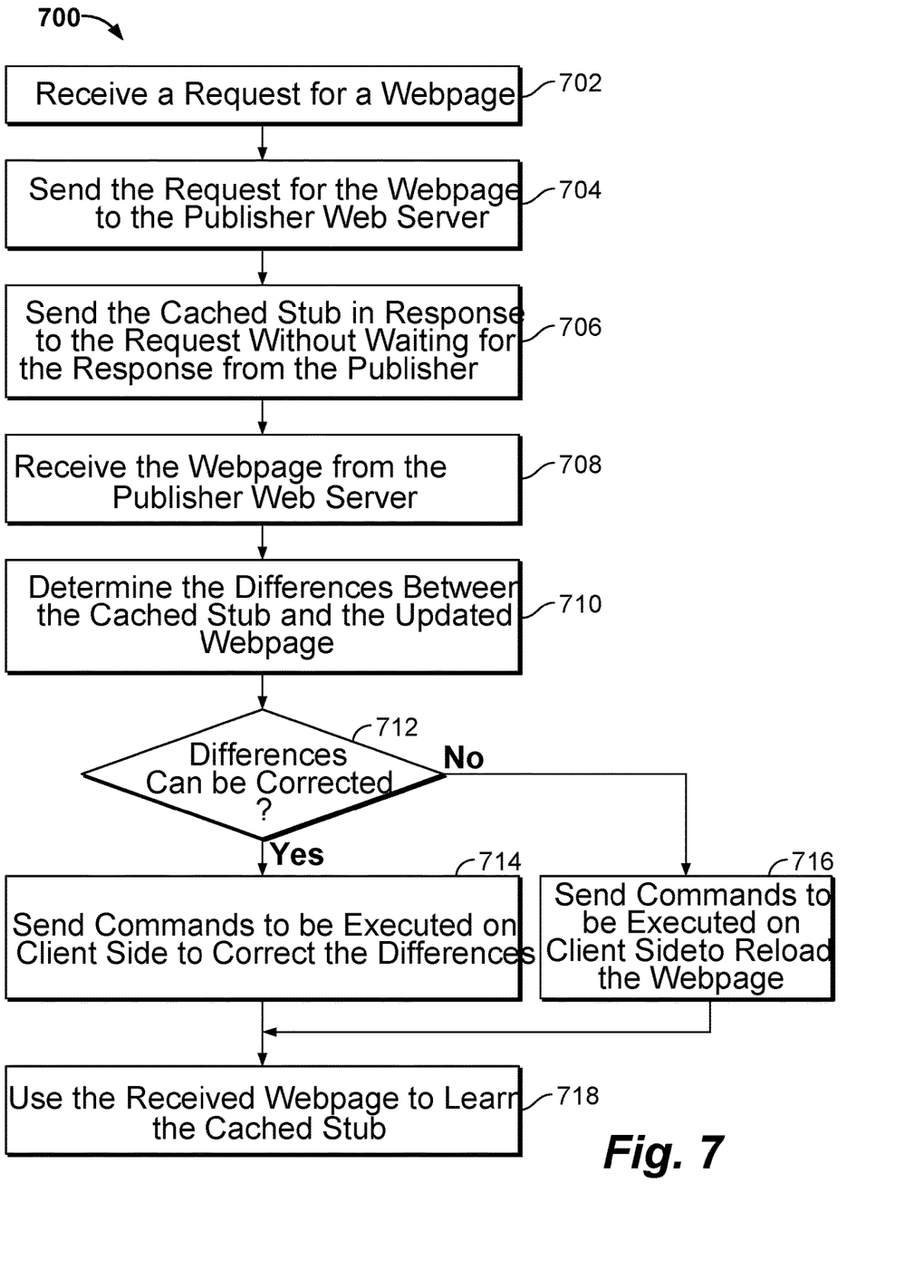
FIG. 7 is a flow diagram illustrating an embodiment of a process 700 for delivering a webpage using HTML streaming.

FIG. 6 is a timing diagram illustrating an exemplary sequence of requests and responses sent and received by client device 110, server system 402, and publisher web server 116 when HTML streaming is used to deliver a webpage. FIG. 7 is a flow diagram illustrating an embodiment of a process 700 for delivering a webpage using HTML streaming. In some embodiments, process 700 is a process running on server system 402 in FIG. 4.

With reference to FIGS. 4 and 6-7, at time $t_1$, web browser 112 running on client device 110 sends an HTTP request message requesting an HTML webpage. At time $t_2$ and step 702, server system 402 receives the HTTP request message. At step 704, after receiving the HTTP request message, server system 402 forwards the HTTP request message to publisher web server 116, queries publisher web server 116 for the latest version of the HTML webpage, and waits for the HTML webpage in an HTTP response message, which is expected to be sent by publisher web server 116 in response to the HTTP request message.

Step 706 may be performed in parallel with step 704. At step 706, without waiting for the arrival of the HTTP response message from publisher web server 116, server system 402 sends a temporary webpage (hereinafter referred to as the fast-delivery webpage) based on profiling information corresponding to the requested webpage to web browser 112. The fast-delivery webpage is a "safe," cacheable "stub" that was previously generated and cached by server system 402. The cached stub includes cacheable components, e.g., static and shared non-unique components, of the HTML webpage. The components include script components or other elements, such as meta elements and link elements. The components also include all the information (e.g., resource identifiers) that is required by web browser 112 or Nanovisor 420 to load the resources included in the loading order configuration. The cached stub generated by server system 402 includes information and resources that server system 402 predicts web browser 112 would actually receive or need to further download had the actual webpage been sent by publisher web server 116 and received by web browser 112. The cached stub also enables the injection of Nanovisor 420 onto client device 110. Nanovisor 420 includes a DOM virtualization layer added on top of the DOM. Virtualization of a DOM of a web browser allows Nanovisor 420 and server system 402 to take control of the DOM for different kinds of optimizations, while keeping the virtualization transparent to the web browser. In some embodiments, Nanovisor 420 may be injected into web browser 112 based on standards-based (e.g., HTML or JavaScript) procedures. For example, Nanovisor 420 may be injected by adding JavaScript client code (e.g., <script src="nanovisor.js"></script>) in the HEAD section of the cached stub webpage.

At time $t_3$, web browser 112 receives the cached stub from server system 402. Nanovisor 420 initializes and starts to run on client device 110. Web browser 112 no longer needs to stay idle, but is unblocked from handling different tasks. For example, web browser 112 may begin to process any information included in the cached stub or to load some of the information onto memory, or may begin to initiate further downloading of dependent resources, including images, videos, audio clips, and the like.

Server system 402 continues to wait for the actual HTML webpage in an HTTP response message, which is expected to be sent by publisher web server 116 in response to the HTTP request message. At time $t_4$, publisher web server 116 receives the HTTP request message forwarded by server system 402. In response to the HTTP request message, publisher web server 116 processes the request message and generates the HTTP response message, including the most updated HTML webpage and sends the HTTP response message to server system 402. At time $t_5$ and step 708, server system 402 intercepts the HTTP response message.

Server system 402 scans and processes the received webpage from publisher web server 116. At step 710, server system 402 compares the received webpage with the cached stub that has already been sent by server system 402 to web browser 112 to determine the differences between the two versions. At step 712, server system 402 determines whether the differences between the two versions can be patched/corrected safely, i.e., without any side effects or errors. At step 714, if the differences can be corrected safely, then server system 402 creates a set of correction/patch commands (e.g., JavaScript commands) that can be run by Nanovisor 420 to correct the differences. For example, the set of commands may delete or modify the components that were previously included in the cached stub webpage. The set of commands may also add new components in the updated webpage that were not included in the cached stub webpage. At step 716, in the event that the differences cannot be corrected safely, server system 402 creates a set of commands that can be run by Nanovisor 420 to direct web browser 112 to reload the HTML webpage. At step 718, the received webpage is used to automatically learn the cached stub corresponding to the received webpage.

At time $t_6$, server system 402 completes the response to web browser 112 by sending the commands and any additional information to web browser 112, such that web browser 112 may complete the rendering of the actual HTML webpage. At time $t_7$, Nanovisor 420 intercepts the commands and information and executes the set of commands. By time $t_8$, either the differences between the cached stub webpage and the most updated version of the HTML webpage are corrected safely or the HTML webpage is reloaded if the differences cannot be corrected safely without any side effects or errors.

As shown in FIG. 6, using HTML streaming techniques, if a cached stub webpage is cached at server system 402 and sent to web browser 112, web browser 112 is unblocked at time $t'_1$ and may begin to process any information included in the cached stub webpage or load some of the information onto memory, or begin to initiate any further downloading of dependent resources, including images, videos, audio clips, and the like. The above described techniques enable more efficient use of both bandwidth and computing resources by reducing the idling time within which bandwidth and computing resources are unutilized. Without HTML streaming, the HTTP request message would have gone all the way to publisher web server 116 and the HTTP response message would have arrived at web browser 112 at time $t'_2$, as shown by the dashed path on FIG. 6. The time difference ($t'_2 - t'_1$) is the reduced idling time of web browser 112 due to HTML streaming. The time difference allows web browser 112 a head-start in the rendering of the HTML webpage.

Figure 8:
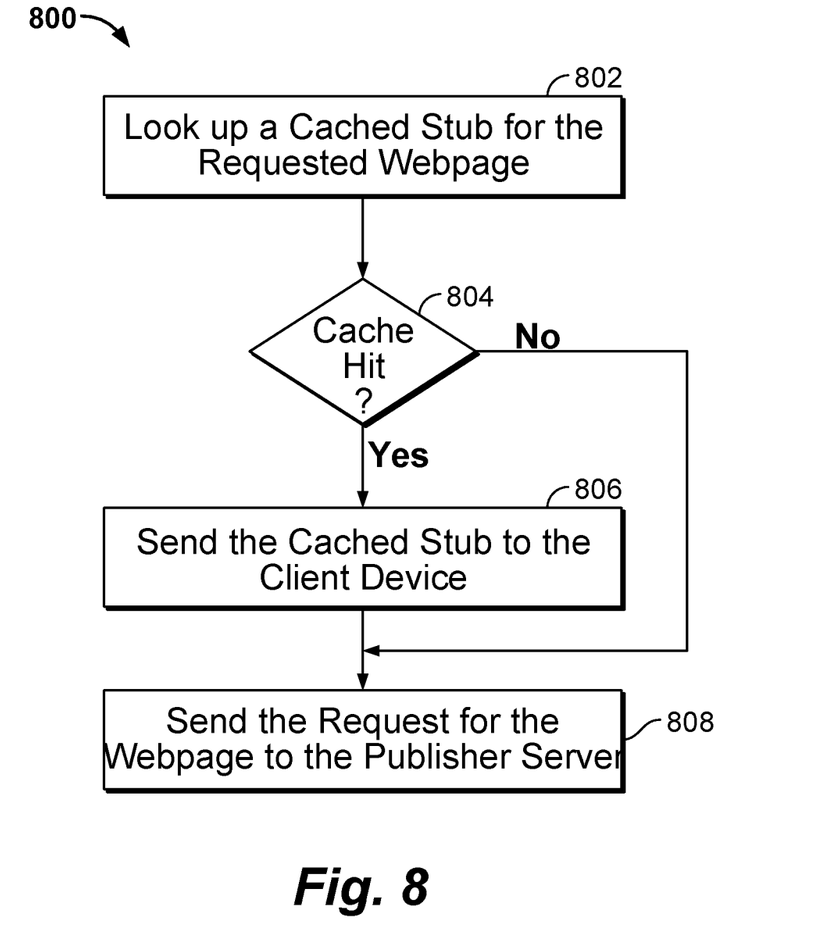
FIG. 8 illustrates an embodiment of a process 800 after the proxy server receives a request for a webpage.

FIG. 8 illustrates an embodiment of a process 800 after the proxy server receives a request for a webpage. In some embodiments, process 800 is a process performed at steps 704 and 706 of process 700 in FIG. 7.

At step 802, after receiving the HTTP request message requesting a webpage, server system 402 looks up a cached stub for the requested webpage in a cache. At step 804, if there is a cache hit, then at step 806, the cached stub corresponding to the requested webpage is sent to web browser 112 as the cached stub webpage. Nanovisor 420 is injected by adding JavaScript client code (e.g., <script src="nanovisor.js"></script>) in the head section of the cached stub webpage. At step 808, server system 402 forwards the HTTP request message to publisher web server 116, querying publisher web server 116 for the latest version of the HTML webpage. At step 804, if there is not a cache hit, then process 800 proceeds to step 808 and server system 402 forwards the HTTP request message to publisher web server 116, querying publisher web server 116 for the latest version of the HTML webpage.

In some embodiments, chunked transfer encoding is used to deliver the cached stub webpage sent at step 806 of process 800 first and then subsequently any updated or additional information extracted from the updated webpage from publisher web server 116. Chunked transfer encoding is a data transfer mechanism in version 1.1 of HTTP wherein data is sent in a series of "chunks". The mechanism uses the Transfer-Encoding HTTP header in place of the Content-Length header, which the protocol would otherwise require. Because the Content-Length header is not used, the sender does not need to know the length of the content before it starts transmitting a response to the receiver; senders can begin transmitting dynamically-generated content before knowing the total size of that content. The size of each chunk is sent right before the chunk itself, so that the receiver can tell when it has finished receiving data for that chunk. The data transfer is terminated by a final chunk of length zero.

For example, server system 402 may use chunked transfer encoding to send the cached stub corresponding to the requested webpage in a series of one or more initial "chunks" to web browser 112. Any updated or additional information and any commands to correct the differences between the sent version and the updated version of the webpage may be sent to web browser 112 in a series of subsequent "chunks." When all the updated information and commands have been sent, the data transfer is terminated by a final chunk of length zero. For example, server system 402 may send an initial "chunk" that includes the head section and the <body> tag of the HTML webpage file. The head section includes the cached stub, which includes the cacheable components, e.g., static and shared non-unique components, of the HTML webpage. The head section also includes the injected virtualization client code. The head section also includes all the information (e.g., resource identifiers) that is required to load the resources included in the loading order configuration. After the updated webpage file is received from publisher web server 116, server system 402 may send a subsequent "chunk" (or subsequent "chunks") that includes the actual content of the body section, any updated information and any correction commands, followed by the </body> and </html> tags.

The cached stub of a webpage should include components that are empirically determined to be safe to be served to web browser 112 ahead of time. One way to guarantee that the cached stub is safe is to work with the content provider. The content provider may identify the static components. The content provider may also move the dynamic components out of the head section. However, this method is cumbersome and non-scalable.

In some embodiments, the cached stub is automatically and empirically learned by the system. For any HTML webpage, a cached stub is learned during a learning period. In some embodiments, the learning is a continuous process that repeats after a predetermined period of time. In some embodiments, the learning is a continuous process that repeats after a predetermined number of webpage requests/responses have been sent/received. During a learning period, server system 402 observes which components in the webpage remain common across multiple requests, and which components are changing and how. In some embodiments, server system 402 observes the common components in the head section of the webpage only; only static common components in the head section are included in the cached stub and sent to web browser 112 ahead of time. In some embodiments, server system 402 may observe the common components in the body section as well. In the latter case, the computational overhead is higher, but the static, more common components in the webpage may be delivered ahead of time. At the end of the learning period, the stub is learned and it can be stored in the cache, replacing an older version of the stub learned in the previous learning period.

In some embodiments, process 500 in FIG. 5 is further enhanced by utilizing a web worker, such as a service worker. A web worker is a JavaScript script that runs in the background, independently of other scripts, without affecting the performance of the webpage. A service worker is a type of web worker: it is a JavaScript file that runs separately from the web browser thread, intercepting network requests, caching or retrieving resources from the cache, and delivering push messages. A service worker is a programmable network proxy that enables applications to control network requests, cache those requests to improve performance, and provide offline access to the cached content, thereby making the content loads faster under most network conditions. A service worker may serve as a small CDN for web browser 112.

Typically, the programming of the service worker is controlled by the web developer of the website. Process 500 of FIG. 5 may be enhanced by using Nanovisor 420 instead to configure a service worker to cache the cached stub obtained at step 508 of process 500 in the browser cache. After the service worker is installed and configured once, the service worker remains running on client device 110 even when web browser 112 is closed. During any subsequent visits to the webpage, the service worker may provide the cached stub stored in the local browser cache immediately, thereby accelerating the delivery of the accelerated portions of the third-party tags even further. For example, without a service worker installed, the cached stub may be sent to web browser 112 as soon as server system 402 receives the request for the webpage from web browser 112. With a service worker storing the cached stub of the webpage, the cached stub is available as soon as the user tries to access the webpage, and the resources included in the loading order configuration list may be immediately pre-loaded ahead of the remaining resources of the webpage. In other words, the resource requests or the Ad auction process may be initiated in parallel with the HTML webpage request. The Ad auction process may start even before the HTML webpage request reaches server system 402.

Another advantage of using the service worker is that since the service worker is configured for a particular user, the cached stub may be tuned for the particular user based on the particular user's online behaviors, including the user's login or logout behavior.

In some embodiments, process 500 in FIG. 5 is further enhanced by transforming the domains of any of the resources included in the loading order configuration list or any of the accelerated portions of the third-party tags (such as the Ad creatives) to a domain that is associated with server system 402. Some of the servers corresponding to the original domains may provide slower delivery of those resources. In contrast, server system 402 and Nanovisor 420 form a proxy delivery network that can provide CDN optimizations on these resources. Therefore, by transforming the domains of the resources, the delivery of the resources is handled by the proxy delivery network, thereby accelerating the delivery of those resources.

When the resource identifier is included in a HTML file, its domain may be transformed by directly transforming the HTML file using the Nanovisor resource domain static transformation feature or the server system resource domain static transformation feature, as described above. Using these features, rather than requesting a resource of a webpage to be rendered directly from its original content source identified by an original resource identifier (with an original domain) included in the original webpage, the request is proxied and/or rerouted via an optimized intermediary, such as server system 402, which has a different domain. When the resource identifier is dynamically generated by a set of executable code or script, its domain may be transformed by using the Nanovisor resource domain dynamic transformation feature, as described above.

In some embodiments, in addition to accelerating the delivery of the accelerated portions of the third-party tags, the delivery of certain resources may be deferred. By deferring the delivery of these resources, additional network bandwidth is available for delivering the accelerated portions of the third-party tags.

In some embodiments, the non-performance-sensitive third-party tags (e.g., various third-party tags that are related to marketing data gathering) or resources that take extended periods of time to load may be deferred.

The delivery of the deferred resources is performed by Nanovisor 420. In some embodiments, the logic of Nanovisor 420 that determines which resources are selected as deferred resources is based on configuration. For example, the web publisher of the website may provide such a configuration. The configuration may include a list of resources whose delivery may be deferred. In some embodiments, the web publisher may provide indications that certain resources may be good candidates for deferral of delivery. For example, the async attribute is a Boolean attribute; when present, it specifies that the script will be executed asynchronously as soon as it is available; this allows scripts to load without blocking the HTML parser. Resources with the async attribute set may be selected by Nanovisor 420 as deferred resources.

In some embodiments, the logic of Nanovisor 420 that determines which resources are selected as deferred resources is determined by the profiling process performed at step 504 of process 500. In some embodiments, the loading order configuration lists the resources corresponding to the one or more pre-conditions determined at step 504 of process 500 at the beginning, followed by at least some of other remaining resources of the webpage; the remaining resources listed at the tail end of the list may be selected as deferred resources.

Nanovisor 420 may utilize the Nanovisor network request deferral feature, as described above, to defer the delivery of the selected deferred resources. Nanovisor 420 is configured to control access to the DOM interface to "intercept" resource requests originating from the one or more code instructions, such that the timing of network requests for resources is altered. For example, resource requests may be intercepted, and the sending of the corresponding network requests for the resources is deferred. To achieve this, Nanovisor 420 may implement one or more wrapper methods/functions with respect to one or more APIs that cause the web browser 112 to issue network requests. For example, Nanovisor 420 may implement one or more wrapper methods for the setAttribute API method to intercept setting of an attribute of a DOM element. In some examples, the requests to the API call may originate from a script included in the webpage definition 200 and/or a script resource referenced by the webpage definition 200, which, when executed, includes one or more dynamic resource identifiers.

In some embodiments, the outcome of the Ad auction process may be altered by system 400 by blocking certain undesirable Ad bidders (e.g. bidders that cause significant delay or bidders that cause the Ad price to go down), thereby providing additional value to the website. Since Nanovisor 420 has the capability to intercept or block certain API calls, Nanovisor 420 may use this capability to block the undesirable Ad bidders.

In some embodiments, system 400 may dynamically monitor and ensure that accelerating the delivery of a plurality of performance-sensitive third-party tags and deferring the delivery of certain resources do not interfere with the delivery performance of the first-party original content. System 400 may dynamically monitor the network resource consumption of the third-party and first-party tags and ensures that the proportion of network resources consumed by the third-party tags does not exceed a predetermined threshold.

In some embodiments, a service worker is installed by Nanovisor 420 to monitor the network resource usage of the third-party tags versus the first-party tags. In some embodiments, if the total third-party resource usage within a pre-determined time window exceeds a predetermined threshold, then Nanovisor 420 may be configured to delay the delivery of the third-party tags. Once the third-party resource utilization is back to an acceptable predetermined threshold, Nanvisor 420 may allow the delivery of the third-party tags to resume.

In some embodiments, the third-party tags are divided into a plurality of policy groups or tiers. For example, some third-party tags may be put into a higher policy group because they generate the most revenue per page or are more sensitive to delivery delays, while other third-party tags may be put into other lower policy groups. If the resource usage of third-party resources within a particular policy group within a predetermined time window exceeds the policy group's predetermined threshold, then Nanovisor 420 may be configured to delay the delivery of the third-party tags in the policy group. Once the resource utilization of the third-party tags in the policy group is back to an acceptable predetermined threshold corresponding to that policy group, Nanvisor 420 may allow the delivery of the third-party tags in that policy group to resume again.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering a webpage, comprising:
   determining that delivery of at least a portion of third-party content associated with a webpage is to be accelerated or that a second portion of third-party content associated with the webpage is to be deferred;
   determining one or more pre-conditions to be met prior to any delivery of the accelerated third-party content, wherein any second portion of the third-party content does not include resources that correspond to the one or more pre-conditions;
   determining a loading order configuration for the webpage based at least in part on the one or more pre-conditions; and
   providing at least a portion of the webpage that modifies a loading order of content portions of the webpage based on the loading order configuration;
   wherein the at least a portion of the webpage also comprises a virtualization client having a wrapper function configured to intercept and delay one or more network requests corresponding to any second portion of the third-party content.

2. The method of claim 1, wherein the accelerated third-party content comprises an advertisement, and wherein determining the one or more pre-conditions comprises determining one or more pre-conditions that are required prior to an initiation of an Advertisement (Ad) auction process.

3. The method of claim 2, wherein the one or more pre-conditions comprise loading one or more libraries required for the Ad auction process.

4. The method of claim 2, wherein the one or more pre-conditions comprise triggering one or more events that are required prior to the initiation of the Ad auction process.

5. The method of claim 4, wherein the one or more events comprise DOM events.

6. The method of claim 2, wherein the one or more pre-conditions are provided by a web publisher of the webpage.

7. The method of claim 6, wherein the loading order configuration for the webpage comprises a list of resources that are pre-loaded in a sequential order, and wherein a resource listed earlier on the list is configured to pre-load at an earlier time than a resource listed later on the list, and wherein the loading order configuration is provided by the web publisher of the webpage.

8. The method of claim 1, wherein the one or more pre-conditions are learned by performing a profiling process for the webpage, wherein the profiling process comprises:
   determining a plurality of timelines for loading of the webpage, wherein a timeline comprises timestamps related to loading of a plurality of resources, and wherein the timeline comprises timestamps related to a plurality of DOM events, and wherein the timeline comprises timestamps of when delivery of the accelerated third-party content begins.

9. The method of claim 8, wherein the loading order configuration for the webpage comprises a list of resources that are pre-loaded in a sequential order, and wherein a resource listed earlier on the list is configured to pre-load at an earlier time than a resource listed later on the list, and wherein the loading order configuration is based on at least some of the timestamps determined by the profiling process.

10. The method of claim 1, wherein the virtualization client is further configured to cause a service worker to cache the at least a portion of the webpage in a browser cache.

11. The method of claim 1, wherein the at least a portion of the webpage comprises a resource identifier corresponding to a resource, and wherein the resource identifier has a transformed domain transformed from an original domain, and wherein the transformed domain corresponds to a first server, and wherein the original domain corresponds to a second server, and wherein the first server and the second server are two different servers.

12. The method of claim 1, wherein the at least a portion of the webpage comprises code that dynamically generates a resource identifier corresponding to a resource, and wherein the resource identifier has a transformed domain transformed from an original domain, and wherein the transformed domain corresponds to a first server, and wherein the original domain corresponds to a second server, and wherein the first server and the second server are two different servers.

13. The method of claim 1, further comprising:
   determining that delivery of at least a third portion of third-party content associated with the webpage is to be blocked.

14. The method of claim 1, further comprising:
   monitoring a first amount of network resource consumption associated with the accelerated third-party content; and
   monitoring a second amount of network resource consumption associated with at least a portion of first-party content associated with the webpage; and
   adjusting the delivery of the accelerated third-party content based at least in part on the first amount of network resource consumption and the second amount of network resource consumption.

15. A system for delivering a webpage, comprising:
   a processor; and a memory coupled with the processor, wherein the memory is configured to provide the processor with instructions which when executed cause the processor to:
  determine that delivery of at least a portion of third-party content associated with a webpage is to be accelerated or that a second portion of third-party content associated with the webpage is to be deferred;
  determine one or more pre-conditions to be met prior to the delivery of the accelerated third-party content, wherein any second portion of the third-party content does not include resources that correspond to the one or more pre-conditions;
  determine a loading order configuration for the webpage based at least in part on the one or more pre-conditions; and
  provide at least a portion of the webpage that modifies a loading order of content portions of the webpage based on the loading order configuration;
  wherein the at least a portion of the webpage also comprises a virtualization client having a wrapper function configured to intercept and delay one or more network requests corresponding to any second portion of the third-party content.

16. The system of claim 15, wherein the accelerated third-party content comprises an advertisement, and wherein determining the one or more pre-conditions comprises determining one or more pre-conditions that are required prior to an initiation of an Advertisement (Ad) auction process.

17. The system of claim 16, wherein the one or more pre-conditions comprise loading one or more libraries required for the Ad auction process.

18. The system of claim 16, wherein the one or more pre-conditions comprise triggering one or more events that are required prior to the initiation of the Ad auction process.

19. The system of claim 18, wherein the one or more events comprise DOM events.

20. The system of claim 16, wherein the one or more pre-conditions are provided by a web publisher of the webpage.

21. The system of claim 20, wherein the loading order configuration for the webpage comprises a list of resources that are pre-loaded in a sequential order, and wherein a resource listed earlier on the list is configured to pre-load at an earlier time than a resource listed later on the list, and wherein the loading order configuration is provided by the web publisher of the webpage.

22. The system of claim 15, wherein the one or more pre-conditions are learned by performing a profiling process for the webpage, wherein the profiling process comprises:
  determining a plurality of timelines for loading of the webpage, wherein a timeline comprises timestamps related to loading of a plurality of resources, and wherein the timeline comprises timestamps related to a plurality of DOM events, and wherein the timeline comprises timestamps of when delivery of the accelerated third-party content begins.

23. The system of claim 22, wherein the loading order configuration for the webpage comprises a list of resources that are pre-loaded in a sequential order, and wherein a resource listed earlier on the list is configured to pre-load at an earlier time than a resource listed later on the list, and wherein the loading order configuration is based on at least some of the timestamps determined by the profiling process.

24. The system of claim 15, wherein the virtualization client is further configured to cause a service worker to cache the at least a portion of the webpage in a browser cache.

25. The system of claim 15, wherein the at least a portion of the webpage comprises a resource identifier corresponding to a resource, and wherein the resource identifier has a transformed domain transformed from an original domain, and wherein the transformed domain corresponds to a first server, and wherein the original domain corresponds to a second server, and wherein the first server and the second server are two different servers.

26. The system of claim 15, wherein the at least a portion of the webpage comprises code that dynamically generates a resource identifier corresponding to a resource, and wherein the resource identifier has a transformed domain transformed from an original domain, and wherein the transformed domain corresponds to a first server, and wherein the original domain corresponds to a second server, and wherein the first server and the second server are two different servers.

27. The system of claim 15, wherein the memory is further configured to provide the processor with instructions which when executed cause the processor to:
  determine that delivery of at least a third portion of third-party content associated with the webpage is to be blocked.

28. The method of claim 15, wherein the memory is further configured to provide the processor with instructions which when executed cause the processor to:
  monitor a first amount of network resource consumption associated with the accelerated third-party content; and
  monitor a second amount of network resource consumption associated with at least a portion of first-party content associated with the webpage; and
  adjust the delivery of the accelerated third-party content based at least in part on the first amount of network resource consumption and the second amount of network resource consumption.

29. A computer program product for delivering a webpage, the computer program product being embodied in a tangible, non-transitory computer readable storage medium and comprising computer instructions for:
  determining that delivery of at least a portion of third-party content associated with a webpage is to be accelerated or that a second portion of third-party content associated with the webpage is to be deferred;
  determining one or more pre-conditions to be met prior to the delivery of the accelerated third-party content, wherein any second portion of the third-party content does not include resources that correspond to the one or more pre-conditions;
  determining a loading order configuration for the webpage based at least in part on the one or more pre-conditions; and
  providing at least a portion of the webpage that modifies a loading order of content portions of the webpage based on the loading order configuration;
  wherein the at least a portion of the webpage also comprises a virtualization client having a wrapper function configured to intercept and delay one or more network requests corresponding to any second portion of the third-party content.

* * * * *